United States Patent
Hodnett (10) Patent No.: US 12,492,792 B1
(45) Date of Patent: Dec. 9, 2025

(54) LIGHT SYSTEM WITH A MULTI-FUNCTIONAL THICK LENS

(71) Applicant: Valeo Vision, Bobigny (FR)

(72) Inventor: Don Hodnett, Troy, MI (US)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/794,431

(22) Filed: Aug. 5, 2024

(51) Int. Cl.
*F21S 41/24* (2018.01)
*F21S 41/125* (2018.01)
*F21S 41/147* (2018.01)
*F21S 43/14* (2018.01)
*F21S 43/235* (2018.01)
*F21S 43/249* (2018.01)
*F21S 45/47* (2018.01)

(52) U.S. Cl.
CPC .............. *F21S 41/24* (2018.01); *F21S 41/125* (2018.01); *F21S 41/147* (2018.01); *F21S 43/14* (2018.01); *F21S 43/249* (2018.01); *F21S 43/253* (2024.05); *F21S 45/47* (2018.01)

(58) Field of Classification Search
CPC ........ F21S 41/24; F21S 43/253; F21S 41/125; F21S 41/147; F21S 43/14; F21S 43/249; F21S 45/47; F21S 43/239; F21S 43/15; G02B 6/0076; G02B 6/0078; G02B 6/0028; G02B 6/0046; G02B 6/0075; G02B 6/0091; F21Y 2107/90; F21W 2107/10; F21W 2102/00; F21W 2103/00; F21W 2104/00; F21W 2106/00; F21W 2105/00; F21W 2107/00; F21W 2111/00; F21W 2121/00

See application file for complete search history.

(56) References Cited

U.S. PATENT DOCUMENTS

| | | | |
|---|---|---|---|
| 9,222,637 B2 | 12/2015 | Potter | |
| 9,541,248 B2 | 1/2017 | Potter | |
| 9,651,211 B2 | 5/2017 | Potter et al. | |
| 10,865,956 B1 * | 12/2020 | Shih ...................... | F21S 41/322 |
| 2010/0202153 A1 | 8/2010 | Schwab | |
| 2014/0092601 A1 | 4/2014 | Orisich et al. | |
| 2014/0321139 A1 | 10/2014 | Bungenstock et al. | |

(Continued)

FOREIGN PATENT DOCUMENTS

| | | | | |
|---|---|---|---|---|
| CN | 211694711 U | 10/2020 | | |
| DE | 102012220696 A1 * | 5/2014 | ............... | B60Q 1/38 |
| EP | 2045515 A1 | 4/2009 | | |

(Continued)

OTHER PUBLICATIONS

Search English translation of DE-102012220696-A1 (Year: 2014).*

(Continued)

*Primary Examiner* — Omar Rojas Cadima (74) *Attorney, Agent, or Firm* — Young Basile Hanlon & MacFarlane, P.C.

(57) ABSTRACT

A light system including a multi-functional light system including two or more light blades extending in opposite directions, printed circuit boards in communication with one of the two or more light blades at a first end; a lens in communication with all of the two or more light blades at a second end; light sources on the printed circuit boards that direct light through one of the two or more light blades and into the lens to generate two or more light functions.

16 Claims, 3 Drawing Sheets

(56) References Cited

U.S. PATENT DOCUMENTS

2016/0040850 A1 2/2016 Orisich et al.
2016/0273730 A1 9/2016 Maier et al.

FOREIGN PATENT DOCUMENTS

| FR | 3124844 A1 | 1/2023 | |
| WO | WO-2020080133 A1 * | 4/2020 | ........... B60Q 1/0023 |
| WO | 2023080033 A1 | 5/2023 | |

OTHER PUBLICATIONS

Search English translation of WO-2020080133-A1 (Year: 2020).*
Written Opinion and International Search Report of the International Search Authority for PCT/US2025/039076, mailed Nov. 5, 2025, 15 pgs.

* cited by examiner

LIGHT SYSTEM WITH A MULTI-FUNCTIONAL THICK LENS

FIELD

The present teachings relate to a light system that provides light in two or more colors though a common lens.

BACKGROUND

Vehicles include many different types of lights. Some types of lights included on a vehicle are low beam headlights, high beam headlights, taillights, turn signal lights, fog lights, running lights, or a combination thereof. Each of these lights extend out of an outer surface of a vehicle so that they provide light for the driver or provide notice to surrounding drivers. These light systems generally direct light outward from the vehicle.

Examples of light systems may be disclosed in U.S. Pat. Nos. 9,222,637; 9,541,248; and 9,651,211 all of which are expressly incorporated herein by reference for all purposes. Thus, there is a need for a light system where multiple different light types and/or colors are provided through a common lens. There is a need for a system where a single lens is illuminated by a plurality of blades that each provide different colors and light types. There is a need for a system where multiple different light blades provide light into a common lens. It would be desirable to have multiple discrete lights that are combined together to form a light system that is capable of providing two or more different light types and/or colors.

SUMMARY

The present teachings provide: a light system including a multi-functional light system including two or more light blades extending in opposite directions, printed circuit boards in communication with one of the two or more light blades at a first end; a lens in communication with all of the two or more light blades at a second end; light sources on the printed circuit boards that direct light through one of the two or more light blades and into the lens to generate at least one light function.

The present teachings provide: a light system including: a multi-functional light system including a first light blade including a first end and a second end, an upper arcuate shape extending at least partially from the first end to the second end, and a lower arcuate shape extending at least partially from the first end to the second end; a first printed circuit board in communication with the first light blade at the first end; a lens in communication with the first light blade the second end; a second light blade including a second first end extending away from the first end of the first light blade, and a second second end connected to the lens and extending parallel to the second end of the first light blade; a second printed circuit board in communication with the second first end of the second light blade.

The present teachings provide a light system where multiple different light types and/or colors are provided through a common lens. The present teachings provide a system where a single lens is illuminated by a plurality of blades that each provide different colors and light types. The present teachings provide a system where multiple different light blades provide light into a common lens. The present teachings provide to have multiple discrete lights that are combined together to form a light system that is capable of providing at least one different light types and/or colors.

The present teachings provide one or more of the following: two or more light blades are three light blades that extend parallel to one another; the three light blades include a first light blade that extends adjacent (e.g., between, above, below, along a side) the second light blade and the third light blade; the second light blade provides a light of a first color into the lens and the second light blade provides a light of a second color into the lens to generate a combined light with a third color that is different than the first color and the second color; the two or more light blades extend parallel to one another; the two or more light blades have an upper arcuate shape and a lower arcuate shape that extend generally parallel to one another and extend from the first end to the second end; a heatsink in communication with each of the printed circuit boards; a location of the light sources on the printed circuit board relative to each of the two or more light blades changes a focus of the light extending through each of the two or more light blades; the first end of each of the blades has a top and a bottom and a position of the light sources between the top and the bottom changes a focus of the light extending through the two or more light blades; the printed circuit boards are two printed circuit boards that are extend at an angle relative to one another so that the planes of the printed circuit boards are converging; the second light blade has a second upper arcuate shape that extends at least partially from the second first end to the second second end and a second lower arcuate shape that extends at least partially from the second first end to the second second end; a first heatsink in communication with the first printed circuit board and a second heatsink in communication with the second printed circuit board; wherein the first printed circuit board extends along a first plane and the second printed circuit board extends along a second plane at an angle between the first plane and the second plane is about 15 degrees to about 90 degrees; all or a portion of the first heat sink, the first printed circuit board, or both is located above the lens; all or a portion of the second heat sink, the second printed circuit board, or both is located below the lens and the first printed circuit board; a top of the first light blade and a top of the second light blade are coplanar at the lens; a third light blade connected to the second printed circuit board; the first light blade extends adjacent the second light blade and the third light blade; and/or a first light located on the first printed circuit board that directs light into the first light blade and then into the lens and a second light located on the second printed circuit board that directs light into the second light blade and then into the lens.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a light system. The light system is located within a vehicle. Preferably, the light system is part of a vehicle such as a car, motorcycle, bus, truck, semi-truck, SUV, XUV, four-wheeler, dirt bike, tractor, combine, heavy equipment, farm equipment, industrial equipment, commercial equipment, or a combination thereof. The light system may project light in a forward direction, rear direction, side direction, vertical direction (e.g., z-axis), from a fore to an aft, an aft to a fore, or a combination thereof. Preferably, the light system projects a light from an external surface or an internal surface of the vehicle to a location in front of the vehicle or at an angle relative to the front or rear of a vehicle. The light system may direct some light at the ground. The light system may direct some light above the ground. The light system may be integrated into a front end, a rear end, or both of a car. The light system may be an assembly. The light system may be a sealed light system that is integrated into a vehicle. The light system may be a sub-assembly that is included in a larger light system. The light system may be integrated into another light system and may function to be part of the light system. The light system may project light out of the vehicle. The light systems may be multiple light systems or light sources stacked one above the other, side by side, within different planes, within a same plane and projecting in different direction, integrated into a single light system, or a combination thereof. The light system may have multiple smaller light systems or light sources. The plurality of light systems or lights may be located in one light system. The plurality of light systems may operate independently of one another such that one light system may not affect another light system or portion of the light system. The light of the vehicle may be two or more, three or more, or four or more light systems located adjacent one another. The light system may be or include a multi-functional light system that includes one or more light sub-assemblies.

The multi-functional light system may be configured to provide two or more light functions though a common lens. The multi-functional light system may have two or more light functions intertwined so that the two or more light functions are located within a compact packing space. The multi-functional light system may provide one or more types of light, two or more types of light, two or more colors of light, two or more intensities of light, or a combination thereof. The multi-functional light system may provide a plurality of light colors. The number of light colors may be equal to or greater than the number of light blades. The multi-functional light system may be two or more light sub-assemblies connected together to provide light out of a single lens and/or a common lens.

The light sub-assemblies function to connect together to form the multi-functional light system to project multiple different light types, light colors, light intensities, or a combination thereof through a lens. Each light sub-assembly may include one or more light sources. Each light sub-assembly may provide one or more light functions. Each light sub-assembly may provide two or more light functions, three or more light functions, or four or more light functions. Each light sub-assembly may include one or more printed circuit boards (PCBs), two or more PCBs, or three or more PCBs. The PCB of each light sub-assembly includes one or more light sources, two or more light sources, or three or more light sources. Each of the light sources may be aligned with a light blade. Two or more light sources may be aligned with each light blade so that two or more light types, two or more light functions, two or more light intensities may be provided through a single light blade.

The light sources function to produce light. The light sources may be a first light source, a second light source, a third light source, a fourth light source, or a combination thereof. Each of the light sources may be different. Some of the light sources may be different and some light sources may be the same. The light source may be a device or a plurality of devices that create light and the light extends outward from the light source. The light source may produce a high beam, a low beam, a blending beam, a running light, a daytime light, a turn signal, a brake light, provide external functions, provide internal functions, interact with ambient light, or a combination thereof. The light sources may have different functions. For example, one light source may provide a running light and another light source may be a turn signal that project light through a common lens. The light source may comprise a plurality of lights or may be a single light source within a set of light sources. The plurality of lights may be in one set or group of light sources. The light source may be a single light that projects light into a blade and then into a lens. Two different light sources may be part of a single light system or a portion of a light sub-assembly. The light source may include a laser diode, glowing phosphor, filament bulb, a light emitting diode, a halogenated light, a xenon light, or a combination thereof. One or more light sources may produce one light function and one or more second light sources may produce a second light function, a third light function, or both. For example, the light functions may be a daytime running light, turn signal, personalized lighting, or a combination thereof. The multi-functional light system may provide a plurality of light functions.

The plurality of light functions may include a first light function, a second light function, a third light function, and a fourth light function. The first light function and the second light function may be different functions. The first light function and the second light function may operate at the same time. The first light function and the second light function may operate at different times. The first light function and the second light function may be optically isolated. The first light function and the second light function may be mechanically connected. The first light function and the second light function may be guided into a common lens. The first light function and the second light function may be located on a same side of a vehicle or adjacent sides of a vehicle. The first light function and the second light function may both be located in a front of a vehicle or in a rear of a vehicle. The plurality of light functions may project out of a front, a side, or both of the vehicle. The first light function and the second light function may provide different colored lights, different light intensities, or both. The system may be located in corners of the vehicle (e.g., drivers side front and passenger side front). The first light function may be a daytime running light. The second light function may be a turn signal. Each of the light functions may include independent light sources. The first light function and the second light function may be a low beam, a high beam, a daytime running light, a turn indicator, a parking light, or a combination thereof. The first light function and the second light function may extend through a same lens, a single lens, or multiple lenses.

The light sources may be any type of lighting device that produces light such as an incandescent bulb, fluorescent light, compact fluorescent lamp, halogen lamp, light emitting diode (LED), high intensity discharge lamps (HID); halogen lights, xenon lights, a laser diode, phosphorous bulb, or a combination thereof. The light source may be a single lamp or bulb. Preferably, the light source is part of a set of light sources that includes a plurality of lamps, bulbs, diodes, or a combination thereof. The light source may be part of a set of light sources that includes 2 or more, 3 or more, 4 or more, 5 more, 7 or more, 9 or more, or 11 or more light sources that produce light and combine together to form the light extending from the light system. The sets of light sources may include 20 or less, 18 or less, 16 or less, or 14 or less devices that produce light (e.g., each set may include 8 light sources or alternatively all of the sets when combined together may include 8 light sources or 2 light sources). Thus, the light source may be one or more lights, two or more lights, or three or more lights. The light source may be static. The light sources may be free of movement. The light source may be fixed. The light sources may be static and may be manually or physically adjusted so that the light sources are directed to a desired location. The light sources may be fixed and the light from the light source may be moved, bent, directed, or a combination thereof by optical elements, textured portions, micro optics, or reflectors (e.g., a light guide). Each device (e.g., light or LED) of the light source may be turned on and off. The light source may be located within a light system at a location relative to a light blade. Two or more light sources may be combined within a light sub-assembly to provide multiple light functions through a single lens. Each light guide may receive light from a single light source. The light sources may work together with light sources of other light sub-assemblies to generate a light function.

The light from each of the light sources may extend outward from the light source at an angle towards an inboard side and an outboard side. Light from each of the light sources may be directed into a light blade. Each of the sets of light sources or functions of the light sources may generally emit light in a same direction. For example, a first function may extend along a first side of the axis and a second function may extend along a first side of the axis but further outward relative to the axis than the first light function. A direction the light is projected may be based on a location where the light extends from the light blade into the lens. For example, if the light blade is in a center of the lens, the light may project out of all sides of the lens. If the light blade is located on a side of center of the lens, then the light may predominantly extend out of that side of the lens. An angle the light extends on an inboard side and an outboard side of the optical axis may be varied based on a shape of a reflector, lens, angle of light into the lens, or a combination thereof.

The light from the first light function and the light from the second light function may extend through a lens. The first light function and the second light function may have mechanically connected lenses. The first light function and the second light function may have optically separated lenses. The first light function and the second light function may each have a lens with a clear portion, a textured portion a texture shutoff, a portion of a blocker, or a combination thereof. The first light function and the second light function may each be generated by one or more lenses (e.g., internal lenses), one or more light blades, or both.

A light blade may be a lens that directs light in one or more directions. The light blade may have total internal reflection that directs light from a light source to a lens (or some other pre-determined direction). The light blade may extend along an x-axis, along a y-axis, along a z-axis. The light blade may be generally square, rectangular, cubic, a cuboid, a rectangular prism, or a combination thereof. The light blades may be generally flat or linear. The light blade has an x-direction length along the x-axis, a y-direction length along the y-axis, and a z-direction length along the z-axis. The length in the x-direction and in the y-direction may be greater than the length in the z-direction. The light blade in the z-direction may be substantially planar. The light blade may direct light in a single direction and then the lens may project the light outward in a predetermined direction. The light blade may permit light to extend therethrough in two or more directions. For example, light may extend through the light blade in an x-direction and in a z-direction. The light blades may be substantially clear. The light blades may have a color. The light blade may be covered on one or more sides by a baffle or blocking portion. The baffle or blocking portion may prevent light from extending into the light blade or into a region of a light blade. The baffle or light blocker may be opaque. The baffle or light blocker may include recesses that allow light to extend therethrough into the light guide. The baffle or light blocker may be located adjacent (e.g., between, above, below, along side) the light blade and the light sources (e.g., lights) so that light only extends into the light blade in a single direction or through a single surface. The light blocker may be internally located within a light blade so that the light when directed through the lens illuminates a pre-determined location.

The light blade may have 6 or more surfaces. The light blade may have a top, bottom, left, right, fore, and aft. Light may extend through the light blade in a first light direction and out of the light blade in the first direction or in a second direction. The light may extend out of a first surface of the light blade in a first light direction, a second light direction, third light direction, or a combination thereof. A single light may extend out of each light blade. Two or more lights may be directed into a blade so that two or more lights extend out of a single light blade. Three or more lights may extend out of a single light blade. Each light may extend out of its own light blade. For example, a first light may extend out of a first light blade and a second light may extend out of a second light blade. The light may extend orthogonally between two surfaces of the light blade. For example, the light may extend orthogonally relative to and between the top and bottom, left and right, or fore and aft surfaces. The light blade may change a direction of the light relative to the light source. The light may extend out of the light source in a first direction and then the light may change to a second direction to extend out of the light blade and into a lens.

Each of the light blades may direct a single light. Multiple light blades may be located adjacent to one another. The light blades may extend parallel to one another. Some light blades may extend in a first direction, and some light blades may extend in a second direction. One light blade may provide a first light and a second light blade may provide a second light blade. For example, a first light may generate a primary light and a second light may generate a secondary light or vice versa. The first light blade and the second light blade may be spaced apart. The first light blade and the second light blade may be mechanically connected together (e.g., to a same PCB). A first light blade may connect to a first printed circuit board and a second light blade and a third light blade may connect to a second PCB. The first light blade, the second light blade, and the third light blade are each discrete pieces. The first light blade may extend in a first plane, the second light blade may extend in a second plane, and the third light blade may extend in a third plane. The first light blade may extend adjacent (e.g., between, above, below, along side) the second light blade and the third light blade. The first light blade may direct light in a first direction and the second light blade may direct light in the first direction. The light blades may extend along a plane. The light blades may have a generally arcuate shape. The light blades may have an upper arcuate shape and a lower arcuate shape.

The upper arcuate shape may be generally parallel the lower arcuate shape. The upper arcuate shape, the lower arcuate shape, or both may extend a portion of a length or an eternity of a length of a side of a light blade. The upper arcuate shape, the lower arcuate shape, or both may curve the light blade from a first plane to a second plane. The upper arcuate shape, the lower arcuate shape, or both may change a shape of the light guide so that the first end and the second end are located at an angle relative to one another. The angle between the first end and the second end may be about 15 degrees or more, about 30 degrees or more, about 45 degrees or more, or about 60 degrees or more. The angle between the first end and the second end may be about 150 degrees or less, about 135 degrees or less, about 105 degrees or less, about 90 degrees or less, or about 75 degrees or less. The light blades may be rainbow shaped. The light blades may have a first end that extends in a first direction. The light blades may have a second end that extends in a second direction. Some light blades may curve in a first direction and some light blades may curve in a second direction that is opposite the first direction. The light blades may extend in opposite directions, symmetrical directions, asymmetrical directions, the blades may have different lengths (e.g., same long, some short, some medium relative to the long and short). First ends of the first light blade and first ends of the second light blade and the third light blade may extend away from one another. Second ends of the first light blade, the second light blade, and the third light blade may all terminate at a lens. Each blade may have a first end and a second end. Thus, the first light blade may have a first first end and a first second end; a second light blade may have a second first end and a second second end; a third light blade may include a third first end and a third second end.

The light from the light blades may be provided at separate times. The light from the light blades may be combined together. For example, light may be directed through a first light blade to provide a first light type such as a daytime running light or a low beam and light may be provided out of two light blades to produce a single light type such as a high beam.

The controllers function to control the lights individually. The controller may be part of the vehicle, part of the light system, or both. A single controller may control all of the lights. The controller may illuminate (e.g., fire) the lights in a sequence, individually, in a pattern, a predetermined manner, a predetermined sequence, randomly, or a combination thereof. The controller may illuminate lights so that light extends into one or more of the light blades and out of the lens. The controller may be programmable, include pre-set programs, or both. The controller may be accessed inside of the vehicle so that the user can change the illumination settings of the light system. The controller may control the lights so that the lights are directed through the light blade into the lens. The controller may control the first light sources and the second light sources to provide light at a predetermined time or a predetermined type of light.

The lens (e.g., internal lens) functions to direct the light from the light blades to a location to be illuminated. An outer lens may extend over an internal lens (e.g., the lens). The lenses may function to direct light outward. The lenses may bend light. The lenses may refract light. The lenses may collimate the light. The lenses may diffuse the light, blend the light, spread the light, direct the light to a predetermined location, create one or more hot spots, create a homogeneous lighting appearance, prevent hot spots, or a combination thereof. The lens may focus light. The lens may mix light to form combined light. For example, if two different colored lights are directed int the lens, the lens may mix the light to generate a third colored light. The light of the light blades may be combined to form a third color. The light may be combined, not combined, varied in intensity, varied in color, provided in a sequence, or a combination thereof by turning on and off lights within the light system. Light may be combined to increase intensity of the light. The lights may both be a same color and the light may be combined to emit more light. Light from a first light source may extend only through a first light blade. Light from a second light source may be directed through a first light blade and a second light blade so that the first light blade may provide a different color than when light is directed from the first light source. For example, the first light source may provide a white light through the first light blade and the second light source may provide an amber light through the first light blade and a second light blade. Thus, multiple different colors and intensities may be generated depending on the number of light sources and the number of light blades in the light system. The lens may provide multiple different light functions depending on how the light is directed into the lens. For example, a first light blade may direct light into a first location of the lens to produce a first light function and a second light blade may direct light into a second location of the lens to produce a second light function. Light from the first blade may be directed through a first lens. Light from a second and third lens may be directed through a second lens. Light from a first light source may extend through the first lens via the first blade and light from a second light source may be directed into the first light blade and through the second lens. Thus, each light blade may have one or more exit faces, two or more exit faces, or three or more exit faces. The lens may be located in front of the light emitting portion or a portion of the light blade that transmits light. The lenses may cover all or a portion of the light system, the light source, light blades, or a combination thereof. Each light system may include single lens regardless of the number of light blades. For example, three or more light blades may direct light into the single lens. The light system may include a single outer lens that covers each of the light bars, light sources, light blades, internal lenses, or a combination thereof that each provide or perform a different function. The lens may cover the so that light, direct light, reflected light, or a combination thereof extends through the lens. The lens (e.g., primary lens or internal lens) may be a single lens. The one or more lenses may have a shape that directs light to a predetermined location. The one or more lenses may be flat, planar, bio-convex, plano-convex, positive meniscus, negative meniscus, plano-concave, bio-concave, double convex, converging, diverging, or a combination thereof. Each lens has a forward side (or forward surface) and a rearward side (or rearward surface). The lenses may change a color or wavelength of the light extending through the lens. For example, the light source may generate white light and the white light may be converted into orange light as the light extends through the lens. The light blade may include one or more texture portions (e.g., micro-optics) that direct light into the lens.

The texture portions function to prevent hot spots, provide a homogenous light pattern, a homogenous amount of light, spread the light, prevent overlaps of light from light sources, direct the light to a desired location, or a combination thereof. The textured pattern may provide a homogenous lighting appearance when the light is viewed from an external location of a vehicle, an internal location of a vehicle, or both. The texture portion may be added to a lens or light blade. For example, a texture may be sprayed on the lens or light blade, etched into the lens or light blade, mechanically added, mechanically formed, added during molding, or a combination thereof. The textured portions may be on an external surface, an internal surface, a location between the internal surface and the external surface, or a combination thereof. The texture portions may guide light out of the lens or light blade as the light travels through the lens or light blade. The texture portions may be formed while the lenses or light blades are being formed. Some lenses or light blades may include a texture portion on or in an external surface and an internal surface. The textured portions (e.g., micro-optics) may be located in a light blade, on a light blade, in an internal surface of a light blade, on an external surface of a light blade, or a combination thereof. The textured portions may permit light to extend out of the light blade, change directions within the light blade, or both. The textured portions may permit light to exit the light blade at predetermined locations, in predetermined directions. The texture portions on opposing surfaces may extend in a substantially parallel direction, in a direction complementary to a shape of the lens, or both. The texture portion may have a shape that is a pyramid, half circle, square, rectangle, zig zag patterns, lines, cylindrical, tetrahedron, cube, hexagonal, icosahedron, a prism, a pentagonal pyramid, a cone, cuboid, a symmetrical shape, an asymmetrical shape, a geometric shape, a non-geometric shape, or a combination thereof. The textured portion may form an outer surface or a lens. The textured portion may extend substantially a length, a width, or both of the lens. For example, the textured portion may terminate at a texture shutoff such that the textured portion does not extend the length and/or width of the textured shutoff.

The light sources may be located on one or more printed circuit boards. The printed circuit boards (PCB) may provide power, signals, support, or a combination thereof to one or more light sources. The light system may include a first PCB and a second PCB. A first light blade, second light blade, or both may be connected to a first PCB. A second light blade, a third light blade, a fourth light blade, or a combination thereof may be connected to a second PCB. If four light blades are present then a first light blade and second light blade are connected to a first PCB and a third light blade and fourth light blade are connected to a second PCB. If three light blades are present then a first light blade may be connected to a first PCB and a second light blade and a third light blade may be connected to a second PCB. The first PCB and the second PCB may extend at an angle relative to one another. The first PCB may extend within a first plane and the second PCB may extend within a second plane. The angle may be a diverging angle on one side, a converging angle on one side, or both. The angel may be about 90 degrees or less, about 75 degrees or less, about 60 degrees or less, or about 45 degrees or less. The angle may be about 15 degrees or more, about 30 degrees or more, or about 40 degrees or more. The PCB may be fixed within a light system. Each PCB may be connected to a one or more light sources. A first PCB may include a first light source and be in communication with a first light blade. A first PCB may be in communication with a second light blade when an even amount of light blades are present. A second PCB may be in communication with a second light blade and a third light blade. The second PCB may be in communication with a third light blade and a fourth light blade when an even amount of light blades are present. Each PCB may include a number of light sources that correspond to a number of light blades. The PCB may be electrically connected, mechanically connected, or both to one or more light sources discussed herein. The PCBs may aim the light from the light sources. The PCBs may align a light source with a light guide. The PCBs may be connected to a heatsink.

The heatsinks function to remove heat generated by components on the PCB, the light sources of the PCB, or both. The heatsinks may include fins that are in communication with air so that when air passes across the fins of the PCB heat is removed. The heatsinks may extend in different directions. The heatsinks may be located at ends of the respective light blades. Each of the heatsinks may be in communication with a printed circuit board. The heatsinks may be made of metal or any other material that is thermally conductive. The heatsinks may be made of metal. The heatsinks may be made of aluminum. Covers may extend between the heatsinks.

The covers function to protect the light blades, prevent light from the light blades scattering outside of the light system, or both. The cover may be opaque. The cover may be transparent. The cover may connect some or all of the components of the light system together. The cover may prevent the light blades from moving relative to one another. The cover may maintain a position of the first PCB relative to the second PCB.

Figure 1A:
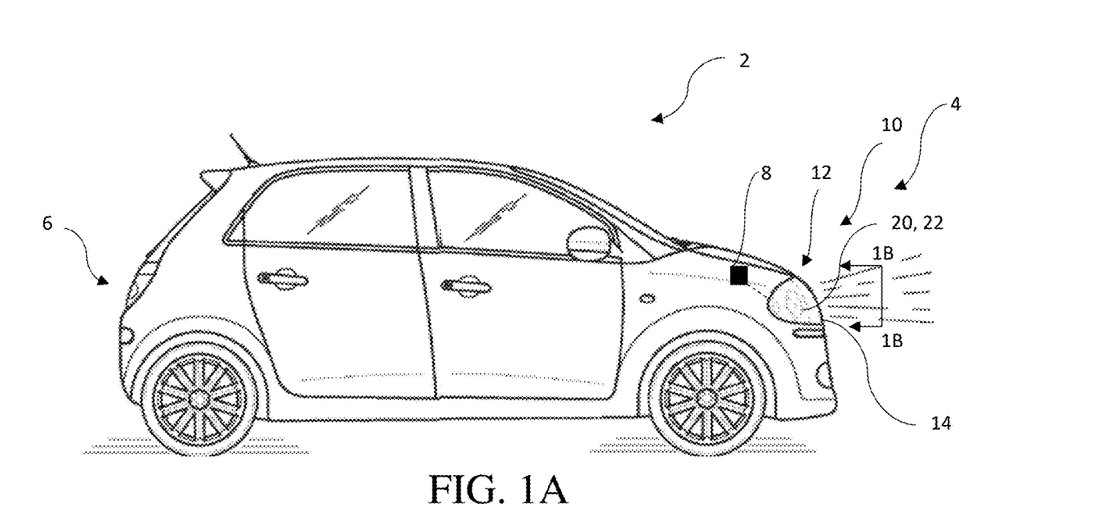
FIG. 1A is a side view of a vehicle including a light system.

FIG. 1A illustrates a side view of a vehicle 2 including light systems 10 located behind an outer lens 14. The light systems 10 includes a first light function 20 and a second light function 24. The light system 10 is a multi-functional light system 12, which provides the first light function 20, is located in a front of the vehicle 2 and is shown as a head light and/or a daytime running light 22. The vehicle 2 and light systems 10 include a fore 4 and aft 6. A controller 8 is connected to the light system 10 to control the light system 10.

Figure 1B:
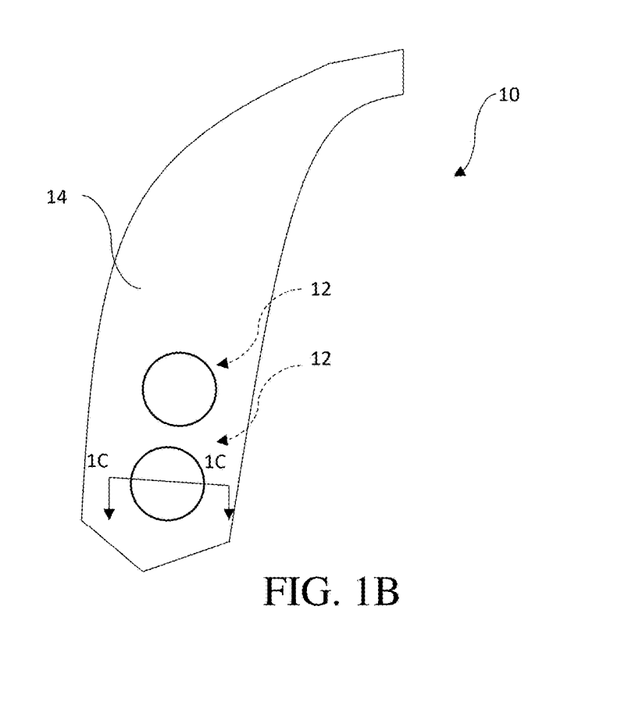
FIG. 1B is a close-up view of the light system of FIG. 1A along line 1B-1B.

FIG. 1B is a front view of the light system 10 of FIG. 1A along line 1B-1B. The light system 10 includes an outer lens 14 and multi-functional light system 12.

Figure 1C:
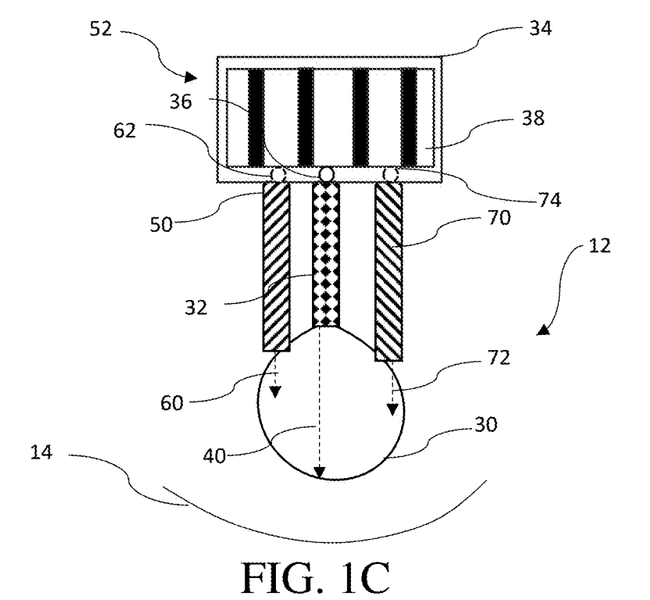
FIG. 1C is a close-up cross-sectional view of a multi-functional light system of the light system along line 10-1C.

FIG. 1C is a cross-sectional view of the multi-functional light system 12 of FIG. 1B along line 1C-1C. The multi-functional light system 12 is located behind an outer lens 14. The multi-functional light system 12 includes a lens 30. The lens 30 in connected to a first light blade 32, a second light blade 50, and a third light blade 70 that each provide light to the lens 30. The first light blade 32 is connected toa first printed circuit board 34 that includes a first light source 36 and is connected to a first heatsink 38. The first heatsink 38 removes heat from the first printed circuit board 34. The second light blade 50 and the third light blade 70 are connected to a second printed circuit board 52 that is located behind the first printed circuit board 34 so that the second printed circuit board 52 is not visible. However, the second light source 62 and the third light source 74 are shown in dotted line to illustrate the light extending into the second light blade 50 and the third light blade 70 respectively. As shown, a first light 40 may extend through the first light blade 32, a second light 60 may extend through the second light blade 50, and the second light 60 or a third light 72 may extend through third light blade 70.

Figure 2A:
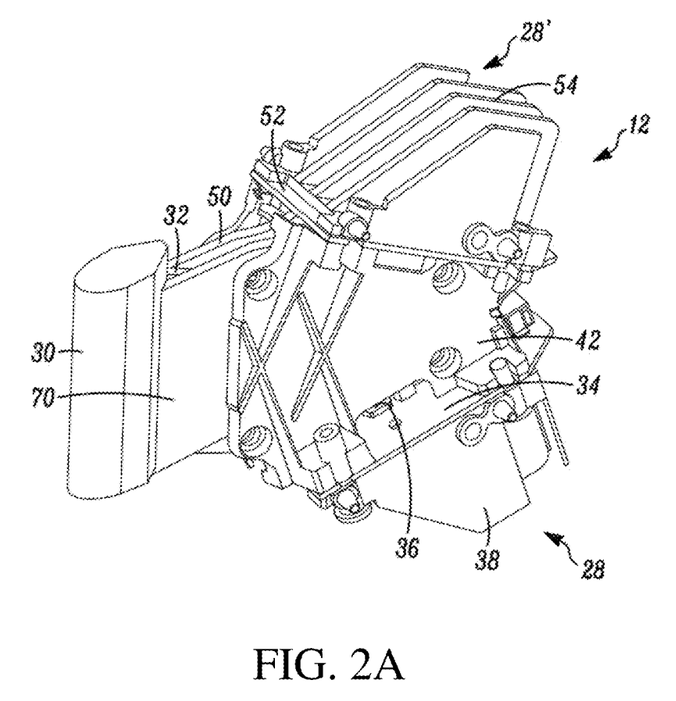
FIG. 2A is a front isometric view of a multi-functional light system of the light system.

FIG. 2A is a front side isometric view of the multi-functional light system 12 including a first light sub-system 28 and a second light sub-system 28'. The multi-functional light system 12 includes a lens 30. The lens 30 is in communication with a first light blade 32, a second light blade 50, and a third light blade 70. The first light blade 32 extends from the lens 30 in a first direction into contact with a first printed circuit board 34 (e.g., the first printed circuit board is inclined relative to a plane of a front edge of the lens) and a first heatsink 38. A first light source 36 is located on the first printed circuit board 34 that directs light into the first light blade 32. The second light blade 50 and the third light blade 70 extend in a second direction that is opposite the first direction. The second light blade 50 and the third light blade 70 extend towards the second printed circuit board 52 and the second heatsink 54. A cover 42 is located between and connects the first printed circuit board 34 and the second printed circuit board 52 together while covering a portion of the first light blade 32, the second light blade 50, and the third light blade 70 (e.g., the second printed circuit board is included relative to the plane of the front edge of the lens).

Figure 2B:
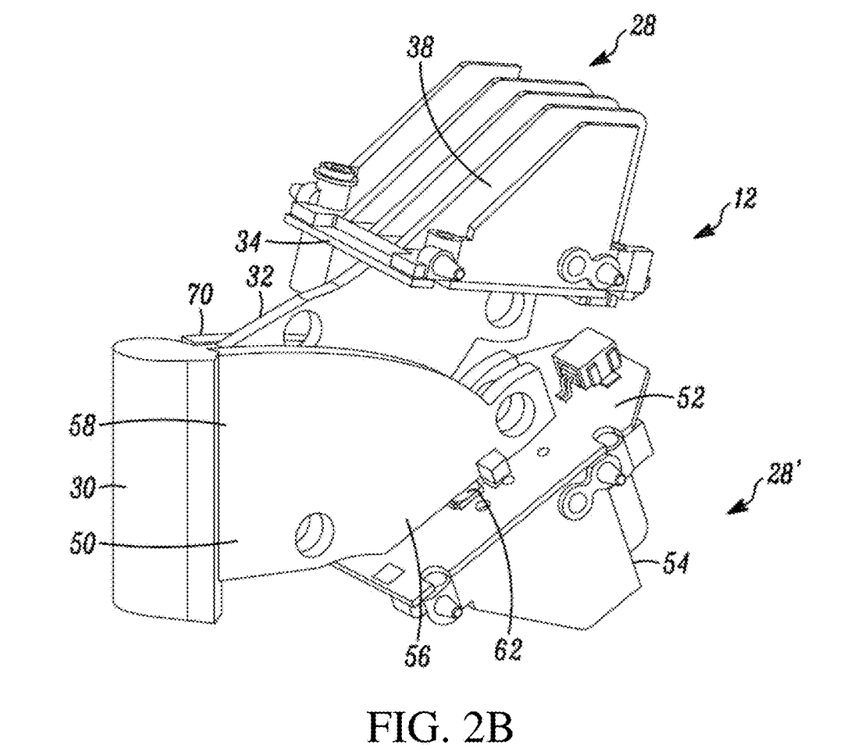
FIG. 2B is a front isometric view of the multi-functional light system of the light system of FIG. 2A with a cover removed.

FIG. 2B is an inverse front side isometric view of the multi-functional light system 12 of FIG. 2A. The multi-functional light system 12 includes a first light sub-assembly 28 and a second light sub-assembly 28'. The multi-functional light system 12 includes a lens 30 that is connected to the first light blade 32, the second light blade 50, and the third light blade 70. The first light blade 32 extends between and is connected to the lens 30 and the first printed circuit board 32 and first heatsink 38. The second light blade 50 has a first end 56 located proximate to and in communication with a second printed circuit board 52 and a second end 58 in communication with a lens 30. A second light source 62 is located on the second printed circuit board 52 to direct light through the second light blade 50. A third light source (not shown) directs light into the third light blade 70. The third light source may be a same type of light and color of light as the second light source 62 or they may be different.

Figure 3:
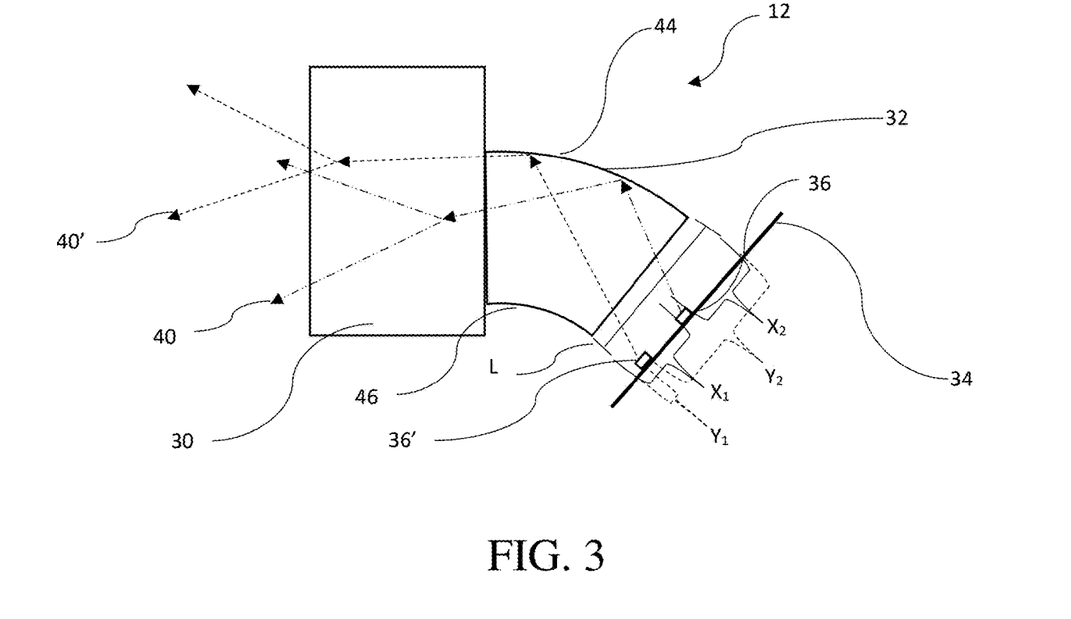
FIG. 3 is a side view of a multi-functional light system.

FIG. 3 illustrates a side view of a multi-functional light system 12. The multi-functional light system 12 includes a lens 30 a first light blade 32 and a first printed circuit board 34 (e.g., the first printed circuit board 34 is included relative to the lens 30). A first light source 36 is located on the first printed circuit board 34. The first light blade 32 has a length (L) that receives light 40 from the first light source 36. The first light source 36 is at a location where there is a length (X1) on a first side and a length (X2) on a second side of the first light source 36 so that the light 40 extends through the first light blade 32 and the lens 30 at a first position. The first light source may be located at a different location if the light is desired to be directed to a different location. The first light source 36' at position 2 may have a length (Y1) on a first side and (Y2) on a second side so that (Y1) is smaller than (Y2). The light 40' may extend through the first light blade 32 and the lens 30 at a second location that is different from the first location. The first light blade 32 extends along a curve between an upper arcuate shape 44 and a lower arcuate shape 46 that are generally parallel to one along relative to one another. The position of the light sources on the printed circuit boards may focus the light differently depending on the type of light desired to be produced.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

ELEMENT LIST

2 Vehicle
4 Fore

6 Aft
8 Controller
10 Light System
12 Multi-functional light system
14 Outer lens
20 First light function
22 Second light function
28 Light Sub-assembly
30 Lens
32 First light blade
34 First printed circuit board
36 First light source
38 First heatsink
40 First light
42 Cover
44 Upper arcuate shape
46 Lower arcuate shape
50 Second light blade.
52 Second Printed circuit board
54 Second heatsink
56 First end
58 Second end
60 Second light
62 Second light source
70 Third Light blade
72 Third light
74 Third light source

I claim:

1. A light system comprising:
a multi-functional light system comprising:
two or more light blades extending in opposite directions,
a printed circuit board located at a first end of each of the two or more light blades;
a lens facing a second end of each of the two or more light blades;
light sources on the printed circuit boards that direct light through one of the two or more light blades and into the lens to generate at least one light function;
wherein the printed circuit board of each of the two or more light blades is inclined relative to a plane of a front edge of the lens;
wherein the two or more light blades are three light blades that extend parallel to one another;
wherein the three light blades include a first light blade that extends adjacent to, and in between, the second light blade and a third light blade.

2. The light system of claim 1, wherein the first light blade provides a light of a first color into the lens and the second light blade provides a light of a second color into the lens to mix the light of the first color and the second color to generate a combined light with a third color that is different than the first color and the second color.

3. The light system of claim 1, wherein the two or more light blades extend parallel to one another.

4. The light system of claim 1, wherein the two or more light blades have an upper arcuate shape and a lower arcuate shape that extend generally parallel to one another and extend from the first end to the second end.

5. The light system of claim 1, further comprising:
a heatsink in communication with each of the printed circuit boards.

6. The light system of claim 1, wherein a location of the light sources on the printed circuit board relative to each of the two or more light blades changes a focus of the light extending through each of the two or more light blades.

7. The light system of claim 6, wherein the first end of each of the blades has a top and a bottom, and a position of the light sources between the top and the bottom changes a focus of the light extending through the two or more light blades.

8. The light system of claim 1, wherein the printed circuit boards are two printed circuit boards that are extend at an angle relative to one another so that planes of the two printed circuit boards are converging.

9. A light system comprising:
a multi-functional light system comprising:
a first light blade comprising:
a first end and a second end,
an upper arcuate shape extending at least partially from the first end to the second end, and
a lower arcuate shape extending at least partially from the first end to the second end;
a first printed circuit board in connected to the first light blade at the first end;
a lens connected to the first light blade at the second end so that the second end faces the lens;
a second light blade comprising:
a second first end extending away from the first end of the first light blade, and
a second second end connected to and facing the lens, and the second second end extending parallel to the second end of the first light blade;
a second printed circuit board in communication with the second first end of the second light blade;
wherein the first printed circuit board and the second printed circuit board are inclined relative to a plane of a front edge of the lens;
further comprising a third light blade connected to the second printed circuit board;
wherein the first light blade extends adjacent, and in between, the second light blade and the third light blade.

10. The light system of claim 9, wherein the second light blade has a second upper arcuate shape that extends at least partially from the second first end to the second second end and a second lower arcuate shape that extends at least partially from the second first end to the second second end.

11. The light system of claim 9, further comprising:
a first heatsink in communication with the first printed circuit board and
a second heatsink in communication with the second printed circuit board.

12. The light system of claim 11, wherein the first printed circuit board extends along a first plane and the second printed circuit board extends along a second plane at an angle between the first plane and the second plane is about 15 degrees to about 90 degrees.

13. The light system of claim 11, wherein all or a portion of the first heat sink, the first printed circuit board, or both is located above the lens.

14. The light system of claim 13, wherein all or a portion of the second heat sink, the second printed circuit board, or both is located below the lens and the first printed circuit board.

15. The light system of claim 9, wherein a top of the first light blade and a top of the second light blade are coplanar at the lens.

16. The light system of claim 9, further comprising:
a first light located on the first printed circuit board that directs light into the first light blade and then into the lens and a second light located on the second printed circuit board that directs light into the second light blade and then into the lens.

\* \* \* \* \*

UNITED STATES PATENT AND TRADEMARK OFFICE
CERTIFICATE OF CORRECTION

| | | |
|---|---|---|
| PATENT NO. | : 12,492,792 B1 | Page 1 of 1 |
| APPLICATION NO. | : 18/794431 | |
| DATED | : December 9, 2025 | |
| INVENTOR(S) | : Don Hodnett | |

It is certified that error appears in the above-identified patent and that said Letters Patent is hereby corrected as shown below:

In the Claims

At Column 14, Claim number 13, Line number 54, replace "heat sink" with --heatsink--.

At Column 14, Claim number 14, Line number 58, replace "heat sink" with --heatsink--.

Signed and Sealed this
Twenty-seventh Day of January, 2026

John A. Squires
*Director of the United States Patent and Trademark Office*